March 20, 1956   W. G. EVANS   2,739,282
VOLTAGE REFERENCE DEVICES
Filed Feb. 5, 1953
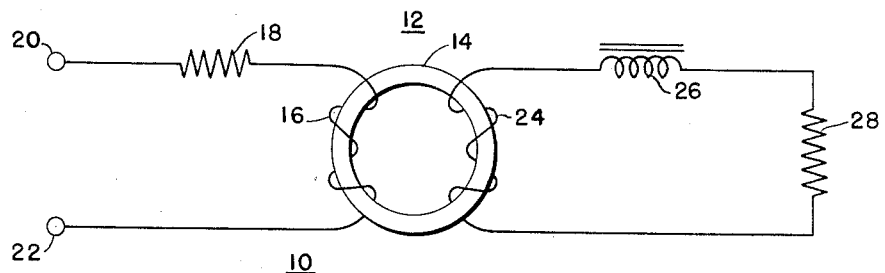
Fig. 1.
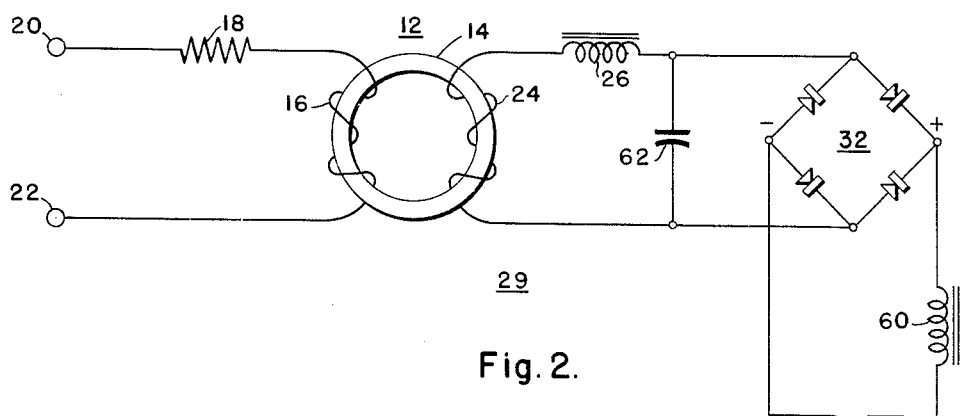
Fig. 2.
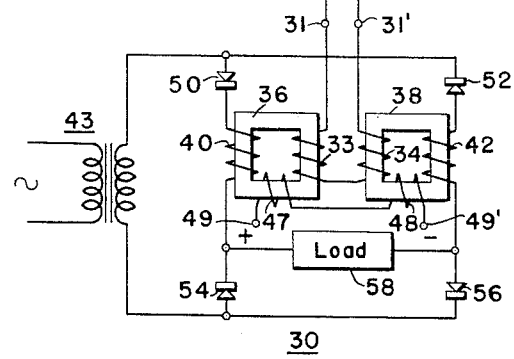
WITNESSES:
John E. Heasley
K. W. Thomas
INVENTOR
William G. Evans
BY
Ezra W. Savage
ATTORNEY United States Patent Office 2,739,282
Patented Mar. 20, 1956

2,739,282

VOLTAGE REFERENCE DEVICES

William G. Evans, Pittsburgh, Pa., assignor to Westinghouse Electric Corporation, East Pittsburgh, Pa., a corporation of Pennsylvania Application February 5, 1953, Serial No. 335,333

5 Claims. (Cl. 323—89)

This invention relates to voltage reference devices, and in particular to such devices employing static components.

Many types of electronic voltage reference devices have heretofore been utilized, however, such electronic devices have disadvantages. For instance, the component parts of such electronic devices have to be replaced periodically, thus interrupting service furnished by other apparatus associated therewith. In addition, the original cost of electronic voltage reference devices is relatively high.

Various types of static voltage reference devices are also known. However, these known static voltage reference devices also have certain limitations. For instance, the apparatus disclosed in application Serial No. 266,205, filed January 12, 1952, and assigned to the same assignee as this invention, does not have a large power output for a given input. On the other hand, other known static voltage reference devices do not maintain a substantially constant output voltage when the frequency of the input voltage is varied over a wide range.

An object of this invention is to provide a voltage reference device which has a high power output for a given power input and which maintains its output voltage substantially constant over a wide range in the frequency of its input voltage, by utilizing an integrating circuit having a low power loss which is responsive to the output of a saturating transformer.

Another object of this invention is to provide a voltage reference device which has a high power output for a given power input and which maintains its output voltage substantially constant over a wide range in the frequency of its input voltage, by integrating the output voltage of a saturating transformer by means of a linear inductance member connected between the output of the saturating transformer and the output of the reference device.

A further object of this invention is to provide a voltage reference device which presents a high impedance to a saturable reactor and also has a high power output for a given power input and a substantially constant output voltage over a wide range in the frequency and magnitude of its input voltage, by rectifying the integrated output voltage from a saturating transformer and passing the rectified current through a linear inductance member and the control winding of the saturable reactor.

Other objects of this invention will become apparent from the following description when taken in conjunction with the accompanying drawing in which:

Figure 1 is a schematic diagram of circuits and apparatus illustrating an embodiment of the teachings of this invention, and Fig. 2 is a schematic diagram of circuits and apparatus illustrating another embodiment of the teachings of this invention.

Referring now to Fig. 1 of the drawing, there is illustrated a voltage reference device 10 comprising a saturating transformer 12, having a magnetic core member 14, preferably formed from square looped core material. In order to magnetically saturate the core member 14 in accordance with the input voltage of the voltage reference device 10, a primary winding 16 is disposed in inductive relationship with the core member 14. In this instance, the primary winding 16 is connected in series circuit relationship with a resistance member 18, the series circuit being electrically connected in circuit relationshp with the input terminals 20 and 22. The input terminals 20 and 22 are supplied with a suitable alternating current voltage of variable frequency and magnitude, the voltage always being of sufficient magnitude to effect a substantially complete saturation of the magnetic core member 14.

When the voltage across the input terminals 20 and 22 is of such magnitude as to effect a substantially complete saturation of the core member 14, the impedance of the primary winding 16 is extremely low. Therefore, it is necessary that the resistance member 18 be connected in series circuit relationship therewith, in order to limit the magnitude of the current flow through the primary winding 16 and thus prevent excess heating and resulting damage to the winding.

In order to produce an average output voltage from the saturating transformer 12, which is substantially independent of the magnitude of the input voltage across the input terminals 20 and 22, a secondary winding 24 is disposed in inductive relationship with the magnetic core member 14. The reason the average output voltage across the secondary winding 24 is substantially constant irrespective of the magnitude of the voltage across the terminals 20 and 22, is that the input voltage is always of such magnitude as to effect a substantially complete saturation of the core member 14. This can be better understood by considering that it takes a predetermined number of volt seconds to saturate the core member 14, and if the input voltage increases, the core member 14 will saturate within a predetermined time interval which will be of shorter duration than in the case when the input voltage is of lesser magnitude. Further, the areas under the voltage-time curves for the primary winding 16 are of substantially equal magnitude irrespective of the magnitude of the voltage across the terminals 20 and 22, since the same predetermined volt seconds are required to saturate the core member 14 each time. Therefore, since there is always a substantially complete saturation of the core member 14 for all magnitudes of voltage across the terminals 20 and 22 above a predetermined value, the impedance of the secondary winding 24 and thus the average voltage thereacross remains substantially constant for varying magnitudes of voltage across the terminals 20 and 22. However, even though the average output voltage across the secondary winding 24 is substantially constant irrespective of the magnitude of the voltage across the input terminals 20 and 22, still the magnitude of the average voltage across the secondary winding 24 does vary with changes in the frequency of the voltage across the terminals 20 and 22.

In order to integrate the output voltage of the saturating transformer 12 and thus maintain the output voltage of the voltage reference device 10 substantially constant over a range of 3 to 1 variation in the frequency of the input voltage across the terminals 20 and 22, a linear iron core inductance member 26 is electrically connected between the secondary winding 24 of the saturating transformer 12 and a load 28. In particular, the inductance member 26 is electrically connected between one end of the secondary winding 24 and one end of the load 28, the other end of the secondary winding 24 being electrically connected to the other end of the load 28. In order for the inductance member 26 to properly function as an integrating device and thus have its impedance vary directly as the frequency of the voltage across the secondary winding 24 of the saturating transformer 12, the value of the reactive impedance for the inductance member 26 must be large as compared to the resistance value of the load 28. When this condition exists, and when the inductance member 26 is connected in circuit relation with the secondary winding 24 and the load 28 as illustrated in Fig. 1, changes in the frequency of the input voltage as applied to the input terminals 20 and 22 effect substantially no change in the integrated voltage wave that flows in the secondary circuit of the saturating transformer 12. Such being the case, the voltage that appears across the load 28, remains substantially constant over a range of at least 3 to 1 in the magnitude of the frequency of the voltage that appears across the input terminals 20 and 22. It is also to be noted that although the apparatus illustrated in Fig. 1 maintains the voltage across the load 28 substantially constant over a wide range in the magnitude and frequency of the input voltage applied to the input terminals 20 and 22, it also has a large power output across the load 28 for a given power input as applied to the input terminals 20 and 22, this feature being obtained by providing the integrating means or inductance member 26 which has an extremely low power loss. Thus, as is desired, substantially all of the power output from the saturating transformer 12 appears across the load 28.

Referring to Fig. 2 there is illustrated another embodiment of the teachings of this invention in which the same reference characters have been given to like components of the apparatus of Figs. 1 and 2. The main distinction between the apparatus illustrated in Figs. 1 and 2 is that in the apparatus of Fig. 2, components, which will be described hereinafter, have been added to the apparatus of Fig. 1 so that the voltage reference device 29 illustrated in Fig. 2 will present a high impedance to a saturable reactor 30 at its output terminals 31 and 31' and at the same time will have a substantially constant output voltage over a range of 3 to 1 variation in the frequency of the input voltage applied to the terminals 20 and 22.

As illustrated, a full wave dry type rectifier 32 having input and output terminals is disposed to rectify the current flowing in the secondary circuit of the saturating transformer 12. In particular, the inductance member 26 is electrically connected between one end of the secondary winding 24 and one of the input terminals of the rectifier 32, the other end of the secondary winding 24 being electrically connected to the other input terminal of the rectifier 32.

In this instance, the saturable reactor 30 is a self-saturating magnetic amplifier, however, it is to be understood that this invention is applicable to any device or saturable reactor which receives energy from a voltage reference device and which must see a high impedance to alternating voltage when looking back into the voltage reference device. For instance, in a saturable reactor, such as the saturable reactor 30, it is generally desirable to obtain as short a time response as possible for the saturable reactor. The short time response is accomplished by inserting a high impedance in series with each of the control windings disposed on the saturable reactor. When one or more of these control windings such as the control windings 33 and 34 of the saturable reactor 30, is responsive to the current output of the voltage reference device 29, it also must have a high impedance to alternating voltage to maintain a short time response for the saturable reactor 30.

As illustrated, the self-saturating magnetic amplifier 30 comprises magnetic core members 36 and 38. In order to magnetize the core members 36 and 38 a predetermined amount, the core members 36 and 38 have inductively associated therewith load windings 40 and 42, respectively, which receive energy from a suitable alternating current source 43. For the purpose of magnetically saturating the core members 36 and 38 in accordance with the output current from the voltage reference device 29, the core members 36 and 38 have inductively associated therewith the control windings 33 and 34, respectively. Other control windings 47 and 48 are also disposed in inductive relationship with the core members 36 and 38, respectively, and have applied thereto a variable D.-C. voltage received from terminals 49 and 49'. When a change occurs in the voltage applied to the control windings 47 and 48, the impedance seen looking back into the voltage reference device 29 at the terminals 31 and 31' must be high so that the response time of the saturable reactor 30 is short. As is well known in the art, self-saturating rectifiers 50 and 52 are connected in series circuit relation with the load windings 40 and 42, respectively, to insure that current flows in only one direction through these main windings. On the other hand, load rectifiers 54 and 56 are provided to prevent the flow of current in both directions through a load 58.

In order that the voltage reference device 29 presents a high impedance to the saturable reactor 30, a linear iron core inductance member 60 is provided. In this instance the inductance member 60 is connected in series circuit relationship with the control windings 33 and 34 of the saturable reactor 30, this series circuit being electrically connected across the output terminals of the rectifier 32. The inductance member 60 also presents a low impedance as seen from the input side of the rectifier 32. This condition satisfies the requirement that the load have a low impedance compared to the inductance member 26 in order for the inductance member 26 to function properly as an integrating means. Not only does the inductance member 60 provide the desired impedance, but it likewise functions to filter the rectified output current from the rectifier 32.

If one desires to obtain an extremely constant output voltage across the terminals 31 and 31' for a narrower range of variation in the frequency of the voltage applied to the input terminals 20 and 22 as compared to the frequency range over which the frequency of the input voltage can be varied in the apparatus illustrated in Fig. 1 and still maintain the output voltage substantially constant, a capacitor 62 is electrically connected in circuit relationship with the input terminals of the rectifier 32. It is to be noted that the capacitor 62 and inductance member 26 illustrated in Fig. 2 do not form a resonant circuit.

The apparatus embodying the teachings of this invention has several advantages, for instance, it comprises all static components which have an extremely long life, particularly when compared to electronic components. In addition to comprising all static components, the apparatus embodying the teachings of this invention maintains with a high degree of accuracy a substantially constant output voltage over a wide range of variation in the magnitude and frequency of its input voltage. The apparatus embodying the teachings of this invention likewise has a high power output for a given power input.

Since various changes can be made in the foregoing embodiments without departing from the spirit and scope of the present invention, it is to be understood that the subject matter set forth hereinbefore shall be interpreted as illustrative and not in a limiting sense.

I claim as my invention:

1. In a voltage reference device, the combination comprising, input terminals for receiving a voltage of variable frequency and magnitude, a saturating transformer comprising a magnetic core member, a primary winding disposed in inductive relationship with the core member and electrically connected in circuit relationship with the input terminals, the voltage impressed across the input terminals always being of sufficient magnitude to effect a substantially complete magnetic saturation of the core member, and a secondary winding disposed in inductive relationship with the core member so that as the frequency of the voltage across the input terminals increases, the average voltage across the secondary winding likewise increases, and low power loss integrating means electrically connected between the secondary winding and the output of the voltage reference device whereby the output voltage of the voltage reference device is substantially constant even though the magnitude and frequency of its input voltage varies over a wide range.

2. In a voltage reference device, the combination comprising, input terminals for receiving a voltage of variable frequency and magnitude, a saturating transformer comprising a magnetic core member, a primary winding disposed in inductive relationship with the core member and electrically connected in circuit relationship with the input terminals, the voltage impressed across the input terminals always being of sufficient magnitude to effect a substantially complete magnetic saturation of the core member, and a secondary winding disposed in inductive relationship with the core member so that as the frequency of the voltage across the input terminals increases, the average voltage across the secondary winding likewise increases, and an integrating device comprising a linear inductance member electrically connected between the secondary winding and the output of the voltage reference device whereby the output voltage of the voltage reference device is substantially constant even though the magnitude and frequency of its input voltage varies over a wide range.

3. In a voltage reference device disposed to supply energy to a load, the combination comprising, input terminals for receiving a voltage of variable frequency and magnitude, a saturating transformer comprising a magnetic core member, a primary winding disposed in inductive relationship with the core member and electrically connected in circuit relationship with the input terminals, the voltage impressed across the input terminals always being of sufficient magnitude to effect a substantially complete magnetic saturation of the core member, and a secondary winding disposed in inductive relationship with the core member so that as the frequency of the voltage across the input terminals increases, the average voltage across the secondary winding likewise increases, a rectifier having input and output terminals, a linear inductance member electrically connected between the secondary winding and the input terminals of the rectifier, and another linear inductance member connected between the output terminals of the rectifier and the output of the voltage reference device whereby the output of the voltage reference device presents a high impedance to the load and has a substantially constant output voltage over a wide range of variation in the magnitude and frequency of its input voltage.

4. In a voltage reference device, the combination comprising, input terminals for receiving a voltage of variable frequency and magnitude, a saturating transformer comprising a magnetic core member, a primary winding disposed in inductive relationship with the core member and electrically connected in circuit relationship with the input terminals, the voltage impressed across the input terminals always being of sufficient magnitude to effect a substantially complete magnetic saturation of the core member, and a secondary winding disposed in inductive relationship with the core member so that as the frequency of the voltage across the input terminals increases, the average voltage across the secondary winding likewise increases, a rectifier having input and output terminals, a linear inductance member electrically connected between the secondary winding and the input terminals of the rectifier, a capacitor electrically connected in circuit relationship with the input terminals of the rectifier, and another linear inductance member connected between the output terminals of the rectifier and the output of the voltage reference device whereby the output of the voltage reference device presents a high impedance and has a substantially constant output voltage over a wide range of variation in the magnitude and frequency of its input voltage.

5. In a voltage reference device, the combination comprising, input terminals for receiving a voltage of variable frequency and magnitude, a saturating transformer comprising a magnetic core member, a primary winding disposed in inductive relationship with the core member and electrically connected in circuit relationship with the input terminals, the voltage impressed across the input terminals always being of sufficient magnitude to effect a substantially complete magnetic saturation of the core member, and a secondary winding disposed in inductive relationship with the core member so that as the frequency of the voltage across the input terminals increases, the voltage across the secondary winding likewise increases, a rectifier having input and output terminals, a linear inductance member electrically connected between the secondary winding and the input terminals of the rectifier, a capacitor electrically connected in circuit relationship with the input terminals of the rectifier, a saturable reactor having a control winding, and another linear inductance member electrically connected between the output terminals of the rectifier and the control winding of the saturable reactor whereby the voltage reference device presents a high impedance to the saturable reactor and the voltage across the control winding is substantially constant over a wide range of variation in the magnitude and frequency of the input voltage across said input terminals for receiving a voltage of variable frequency and magnitude.

References Cited in the file of this patent

UNITED STATES PATENTS

| 2,297,673 | Stevens | Sept. 29, 1942 |

FOREIGN PATENTS

| 271,572 | Switzerland | Feb. 1, 1951 |
| 325,199 | Italy | Mar. 4, 1935 |